United States Patent
Takane

(10) Patent No.: US 7,733,520 B2
(45) Date of Patent: Jun. 8, 2010

(54) DIGITAL CAMERA AND METHOD OF CONTROLLING THE SAME AND APPARATUS FOR AND METHOD OF OUTPUTTING IMAGE

(75) Inventor: Yasuo Takane, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 873 days.

(21) Appl. No.: 11/600,961

(22) Filed: Nov. 17, 2006

(65) Prior Publication Data

US 2007/0153118 A1     Jul. 5, 2007

Related U.S. Application Data

(62) Division of application No. 09/678,328, filed on Oct. 3, 2000, now abandoned.

(30) Foreign Application Priority Data

Oct. 4, 1999     (JP)     ............... P11-282275

(51) Int. Cl.
G06F 15/00     (2006.01)
H04N 9/083     (2006.01)

(52) U.S. Cl. .................. 358/1.6; 348/273

(58) Field of Classification Search .......... 358/1.6, 358/1.16, 1.15, 1.17, 1.18; 348/231.6, 273, 348/207.99, 26, 254; 396/225, 234, 63; 386/95; 370/218, 355; 382/100, 135; 700/28, 700/83

See application file for complete search history.

(56) References Cited

U.S. PATENT DOCUMENTS

| | | | |
|---|---|---|---|
| 5,034,804 A * | 7/1991 | Sasaki et al. ............. 348/231.4 |
| 5,070,405 A | 12/1991 | Ejima et al. |
| 5,420,635 A | 5/1995 | Konishi et al. |
| 5,684,919 A | 11/1997 | Kikuzawa et al. |
| 5,717,965 A | 2/1998 | Iwasaki |
| 5,838,370 A | 11/1998 | Kaji |
| 5,987,265 A | 11/1999 | Iwasaki |
| 6,011,585 A | 1/2000 | Anderson |
| 6,091,908 A | 7/2000 | Fukuda |
| 6,515,698 B1 | 2/2003 | Sasaki et al. |
| 2001/0038417 A1 | 11/2001 | Uehara et al. |
| 2002/0057352 A1 | 5/2002 | Yamagishi |

FOREIGN PATENT DOCUMENTS

| | | |
|---|---|---|
| JP | 3-36886 A | 2/1991 |
| JP | 05-056331 | 3/1993 |
| JP | 05-064075 | 3/1993 |

(Continued)

*Primary Examiner*—Saeid Ebrahimi Dehkordy
(74) *Attorney, Agent, or Firm*—Birch, Stewart, Kolasch & Birch, LLP

(57) ABSTRACT

Even when a part of a subject image is cut down after imaging, an image of good image quality is obtained. When a subject is imaged, divisional photometry (divided brightness measuring) is performed. Image data representing an image of the subject and a divisional photometry values are recorded on a memory card in correspondence with photometry sections obtained by division. At the time of reproduction (playback), image data is read out of the memory card, to display the subject image. A desired part of the displayed subject image is cut out (trimmed). Correction is made such that the brightness of the trimmed image is proper using the divisional photometry values corresponding to the trimmed image.

4 Claims, 14 Drawing Sheets

FOREIGN PATENT DOCUMENTS

| | | |
|---|---|---|
| JP | 5-284448 A | 10/1993 |
| JP | 6-78210 A | 3/1994 |
| JP | 7-284049 A | 10/1995 |
| JP | 7-288761 A | 10/1995 |
| JP | 09-051497 | 2/1997 |
| JP | 9-247611 A | 9/1997 |
| JP | 09-312794 | 12/1997 |
| JP | 2000-13718 A | 1/2000 |
| JP | 2000-194060 A | 7/2000 |
| JP | 2000-201335 A | 7/2000 |

* cited by examiner

REFERENCE IMAGE

FILE NAME
ff001b0.jpg(−1EV)

FILE NAME
ff001b1.jpg(STANDARD AMOUNT OF EXPOSURE)

FILE NAME
ff001b2.jpg(+1EV)

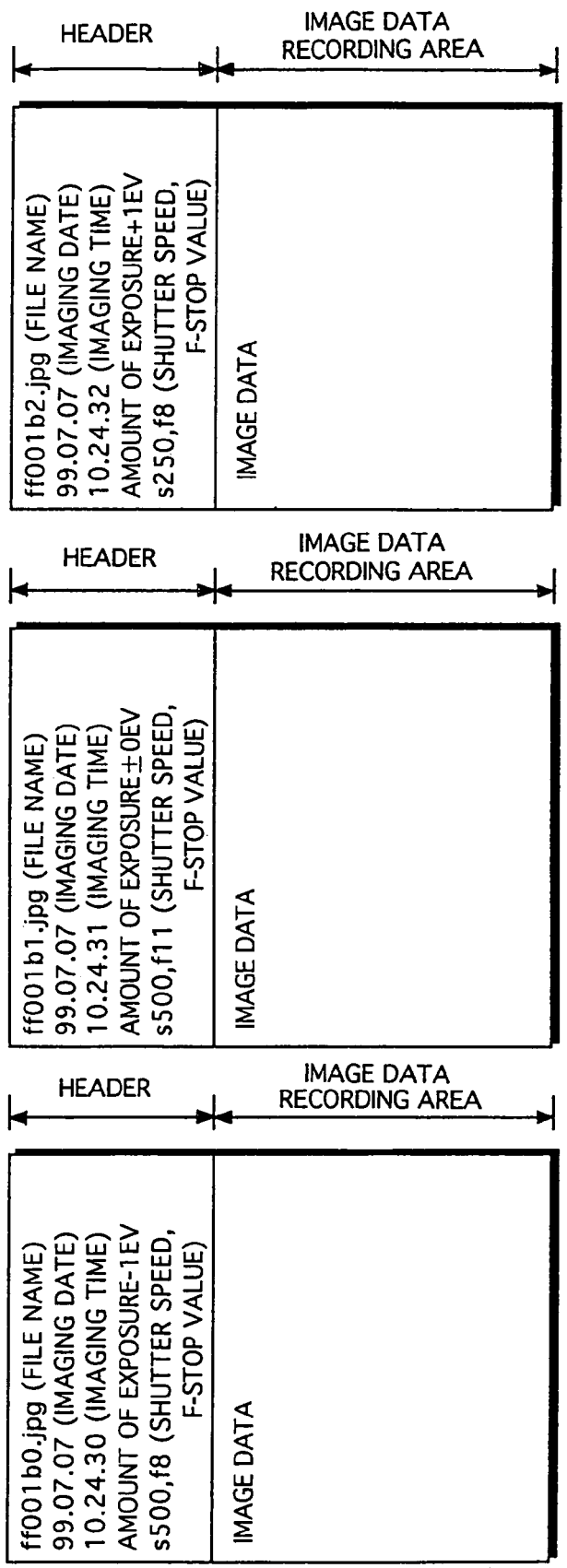

SHORT FOCAL POINT IMAGE

STANDARD IMAGE

LONG FOCAL POINT IMAGE

DIGITAL CAMERA AND METHOD OF CONTROLLING THE SAME AND APPARATUS FOR AND METHOD OF OUTPUTTING IMAGE

This application is a Divisional of application Ser. No. 09/678,328 filed on Oct. 3, 2000, now abandoned and for which priority is claimed under 35 U.S.C. §120, which claims priority of Application No. 11-282275 filed in Japan on Oct. 4, 1999, under 35 U.S.C. §119, the entire contents of both are hereby incorporated by reference in their entirety.

BACKGROUND OF THE INVENTION

1. Field of the Invention

The present invention relates to a digital camera and a method of controlling the digital camera and an apparatus for and a method of outputting image data.

2. Background of the Invention

An amount of exposure in a digital camera is adjusted such that even in a case where a part of an imaging area is bright or dark, the average brightness of the whole image obtained by imaging a subject is a preferable level because the whole of the subject image is too dark or too bright if the amount of exposure is determined on the basis of the bright part or the dark part. When a part of the picked-up image is cut out, therefore, the cut-out part image may, in some cases, be dark or bright.

When the subject is imaged, it is brought into focus such that a main subject in the imaging area is of desired size. At the time of reproduction, when an image of the main subject is enlarged, the main subject image is subjected to electronic zooming processing. The electronic zooming is realized by interpolation between pixels. Accordingly, the image quality of the image which has been electronically zoomed is not so good in many cases.

In any case, if a part of the image is cut down, the image quality of the part image is degraded in many cases. For example, the brightness of the part image is not proper, or the size of a main subject appearing on the part image is not proper so that the electronic zooming is required.

SUMMARY OF THE INVENTION

An object of the present invention is to obtain an image of good image quality even when a part of an image is cut down.

A digital camera according to a first invention is characterized by comprising a photometry device (means) for performing photometry for each of the sections obtained by dividing an imaging area into a plurality of sections to output photometry values; an imaging device (means) for imaging a subject, to output image data representing an image of the subject; an exposure control device (means) for controlling an amount of exposure in the imaging device on the basis of the photometry values outputted by the photometry device; and a recording control device (means) for recording the image data outputted from the imaging device and data representing the photometry values, for each of the sections obtained by the division, which has been outputted by the photometry device on a recording medium with the image data and the photometry value data being related to each other.

The first invention also provides a control method suitable for the above-mentioned camera. That is, the method comprises the steps of performing photometry for each of the sections obtained by dividing an imaging area into a plurality of sections to output photometry values; imaging a subject in an amount of exposure determined on the basis of the outputted photometry values, to obtain image data representing an image of the subject; and recording the obtained image data and data representing the outputted photometry values for each of the sections obtained by the division on a recording medium with the image data and the photometry value data being related to each other.

A second invention is for reading out and reproducing (playing-back) the image data and the photometry value data which are thus recorded on the recording medium.

An image output apparatus according to the second invention is characterized by comprising a reading device (means) for reading, from a recording medium on which image data representing a subject image and data representing photometry values obtained by respectively performing photometry for a plurality of sections obtained by dividing an imaging area are recorded with the image data and the photometry value data being related to each other, the image data and the photometry value data; a display control device (means) for controlling a display device such that the subject image represented by the image data read by the reading device is displayed on a display screen; a designation device (means) for designating a desired image zone in the subject image displayed on the display screen; a brightness adjusting device (means) for correcting, on the basis of the photometry value data corresponding to an image in the zone designated by the designation device, the brightness of the image in the designated zone; and an image data output device (means) for outputting the image data representing the image the brightness of which is corrected.

The second invention also provides a method suitable for the above-mentioned apparatus. That is, the method comprises the steps of reading, from a recording medium on which image data representing a subject image and data representing photometry values obtained by respectively performing photometry for a plurality of sections obtained by dividing an imaging area are recorded with the image data and the photometry value data being related to each other, the image data and the photometry value data; displaying on a display screen the subject image represented by the read image data; designating a desired image zone in the subject image displayed on the display screen; adjusting, on the basis of the photometry value data corresponding to an image in the designated zone, the brightness of the image in the designated zone; and outputting, the image data representing the image the brightness of which is adjusted.

On the recording medium, the image data representing the subject image and the data representing the photometry values obtained by respectively performing photometry for the sections obtained by the division are recorded. The image data is read out of the recording medium, and is displayed on the display screen. The desired zone is designated on the subject image displayed on the display screen.

The correction or adjustment of the brightness of the image in the designated zone is performed on the basis of the photometry value data corresponding to the image in the designated zone. The image data the brightness of which is properly adjusted is outputted.

When the subject is sensed to produce image data representing the subject in the digital camera, divisional photometry (divided brightness measuring) is performed. The obtained photometry values are, on one hand, used for the exposure control in the digital camera, and on the other hand the photometry values are recorded on the recording medium in correlation with the produced image data. The photometry values can be used for adjustment of brightness of the designated zone image. The brightness adjustment is performed easily and properly. In this way, even if a part of image (designated zone image) which has been cut out of a frame of image is improper (too dark or too bright), the part image is adjusted so as to have proper brightness.

An image output apparatus according to a third invention is characterized by comprising a reading device (means) for reading, from a recording medium on which image data representing subject images of a plurality of frames which have been obtained by imaging a subject under different imaging conditions, the image data representing a specified frame of image; a display control device (means) for controlling a display device such that the subject image represented by the image data read by the reading device is displayed on a display screen; a designation device (means) for designating a desired image zone in the subject image displayed on the display screen; retrieval means for retrieving a frame of image data representing the most proper subject image out of the subject images of the plurality of frames with regard to the image in the zone designated by the designation device; and an image data output device (means) for outputting the image data found by the retrieval means.

The third invention also provides a method suitable for the above-mentioned apparatus. That is, the method comprises the steps of reading, from a recording medium on which image data representing subject images of a plurality of frames which have been obtained by imaging a subject under different imaging conditions, the image data representing a specified frame of image; displaying on a display screen the subject image represented by the read image data; designating a desired image zone in the subject image displayed on the display screen; retrieving a frame of image data representing the most proper subject image out of the subject images of the plurality of frames with regard to the image in the designated zone; and outputting the image data found by the retrieval.

In one embodiment, the imaging condition is an exposure amount, so that the subject is imaged a plurality of times under different exposure conditions. A plurality frames of image data having different brightness are obtained and recorded on the recording medium. In this case the retrieval means selects a frame of image data having the most proper brightness with regard to the image in the zone designated by the designation device.

In another embodiment, the imaging condition is a focal length. The subject is imaged a plurality of times under different focal length, for example, by changing the distance from the subject to the digital camera or by changing the zoom magnification. A plurality frames of image data which represents subject of different sized are obtained and recorded on the recording medium. In this case the retrieval means selects a frame of image data having the most proper size with regard to the image in the zone designated by the designation device.

On the recording medium, the image data representing the subject images of the plurality of frames which include the same main subject image but differ in brightness or in size are recorded. The specified image data representing the subject image is read out of the recording medium, and the subject image is displayed on the display screen. The desired zone is designated from the subject image displayed on the display screen.

A frame of image data representing the subject image of good brightness or size with regard to the image of the designated zone is retrieved. The image data found by the retrieval is outputted.

According to the third invention, the frame of image data representing the designated zone image of good brightness or size is outputted. The image having brightness or size which the user can be satisfied with is obtained even if it is not subjected to brightness adjustment or enlargement processing.

In the preferred embodiment, the image output apparatus further comprises an adjusting means for adjusting brightness of the image, in a zone corresponding to the designated zone, of the selected frame of image data. The amount of the adjustment of the output image may be small so that the image is of good image quality.

In the further preferred embodiment, the image output apparatus further comprises an enlarging means for enlarging the size of the image, in a zone corresponding to the designated zone, of the selected frame of image data. The amount of the enlargement of the output image may be small so that the image is of good image quality. When the electronic zooming (enlarging) processing is performed, the image quality is generally deteriorated. However the amount of the enlargement is small, the good image quality is maintained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8a to 11 show a second embodiment;

FIGS. 8a to 8c illustrate examples of subject images;

FIGS. 9a to 9c illustrate the structures of image files;

FIG. 10 illustrates the structure of an image file:

FIG. 11 is a flow chart showing the procedure for processing at the time of reproducing an image;

FIGS. 12a to 14 show a third embodiment;

FIGS. 12a to 12c illustrate examples of subject images;

FIG. 13 illustrates the structure of an image file; and

FIG. 14 is a flow chart showing the procedure for processing at the time of reproducing an image.

DESCRIPTION OF THE PREFERRED EMBODIMENTS

Figure 1:
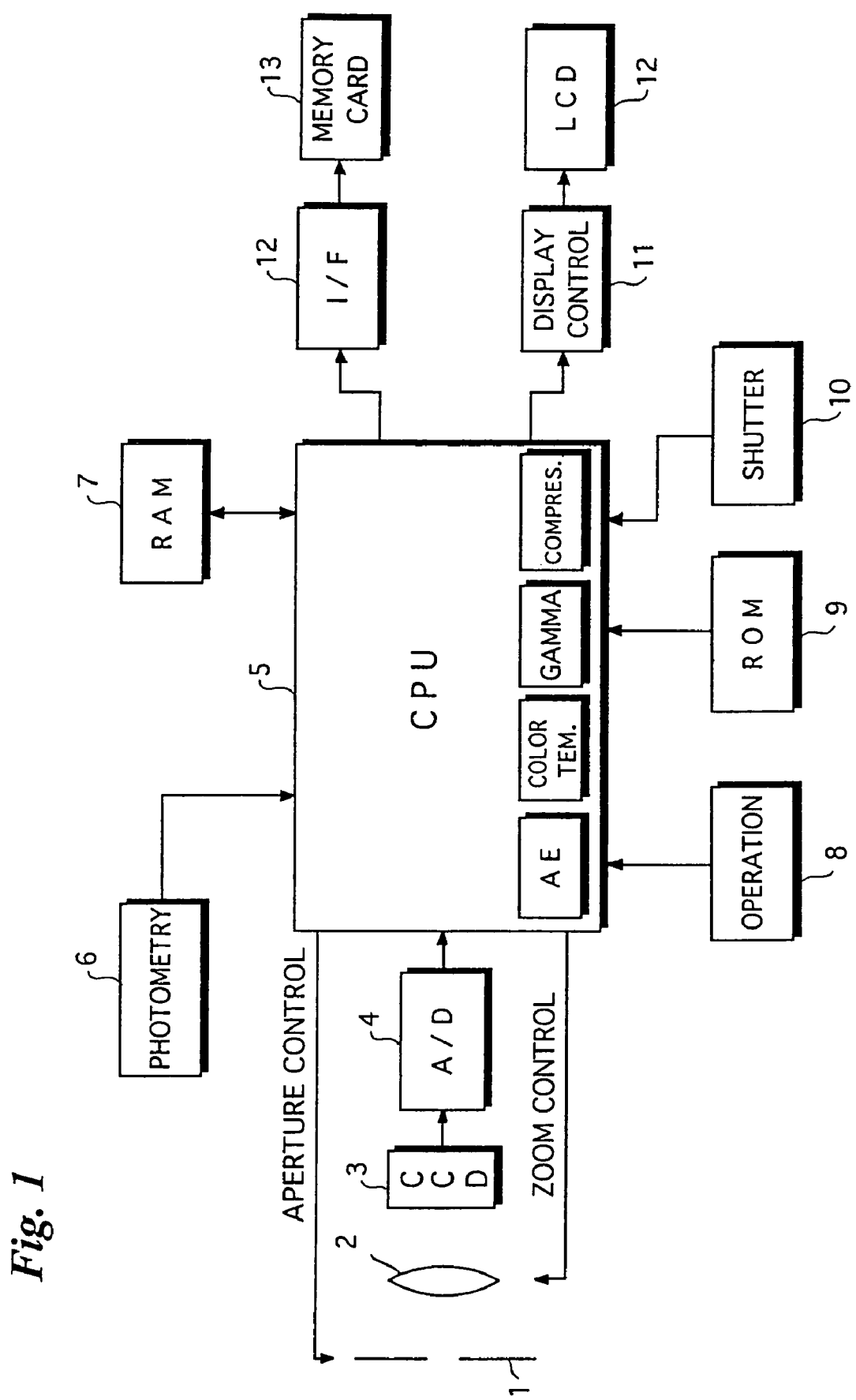
FIG. 1 is a block diagram showing the electrical configuration of a digital still camera according to a first embodiment.

FIG. 1 is a block diagram showing an embodiment of the present invention, which illustrates the electrical configuration of a digital still camera.

The digital still camera can perform zoom imaging, and is provided with a zoom lens 2. The zoom amount of the zoom lens 2 is controlled by a CPU 5.

The CPU 5 has functions such as AE (Automatic Exposure Control), color temperature adjustment (control), gamma correction, and data compression.

The digital still camera is provided with an aperture 1. The aperture 1 is controlled on the basis of the AE.

A shutter release button 10 is of a two-stage stroke type. The shutter release button 10 is pushed down in a first stage, to carry out aperture control, while being pushed down in a second stage, to record image data representing a subject image. A signal representing the push-down of the shutter release button 10 is inputted to the CPU 5.

The digital still camera is provided with operation switches 8. It is possible to set an imaging mode, set a reproduction (playback) mode, and set a zoom amount and a zoom area by the operation switches 8. Signals representing the setting from the operation switches 8 are inputted to the CPU 5.

A ROM 9 storing an execution program is externally attached to the CPU 5.

Furthermore, the digital still camera is provided with a photometry device 6 capable of performing divisional photometry (divided brightness measuring). A photometry value for each of a plurality of sections obtained by dividing an imaging area is obtained in the divisional photometry. A signal representing the photometry value(s) is (are) inputted to the CPU 5. It goes without saying that the photometry device 6 may not be provided, to calculate divisional photometry values from image data obtained by imaging, as described later.

When the imaging mode is set by the operation switch 8, a light image representing the subject image is formed on a light receiving surface of a CCD 3 by the zoom lens 2. A signal representing the subject image is outputted from the CCD 3, and is inputted to an analog-to-digital converting circuit 4. An inputted analog image signal is converted into digital image data by the analog-to-digital converting circuit 4. The digital image data is inputted to the CPU 5.

The digital image data is fed to a liquid crystal display device 12 from the CPU 5 through a display control circuit 11. The subject image obtained by the imaging is displayed on a display screen of the liquid crystal display device 12 by the display control circuit 11.

Figure 2:
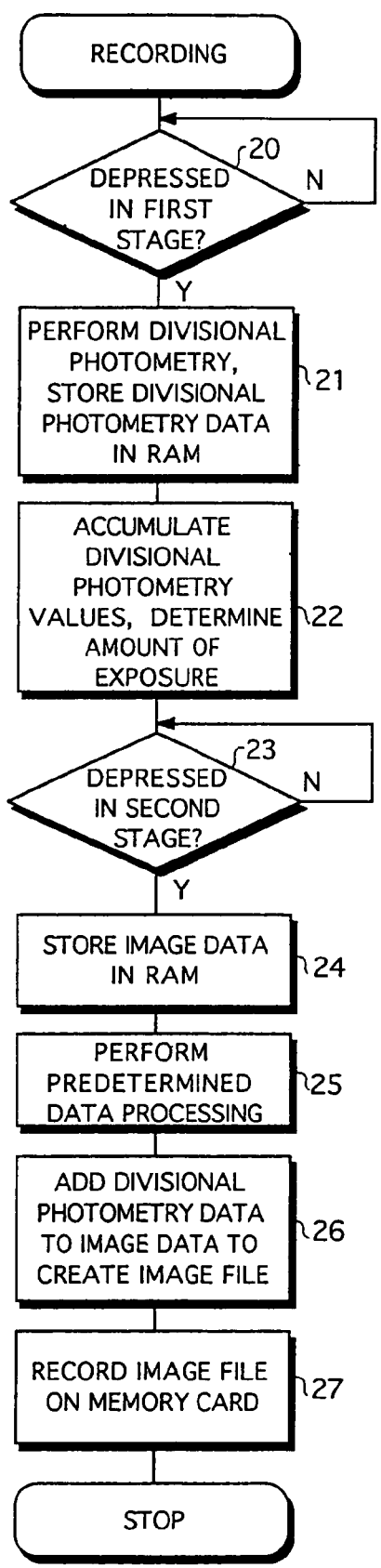
FIG. 2 is a flow chart showing the procedure for processing at the time of recording image data.
Figure 3:
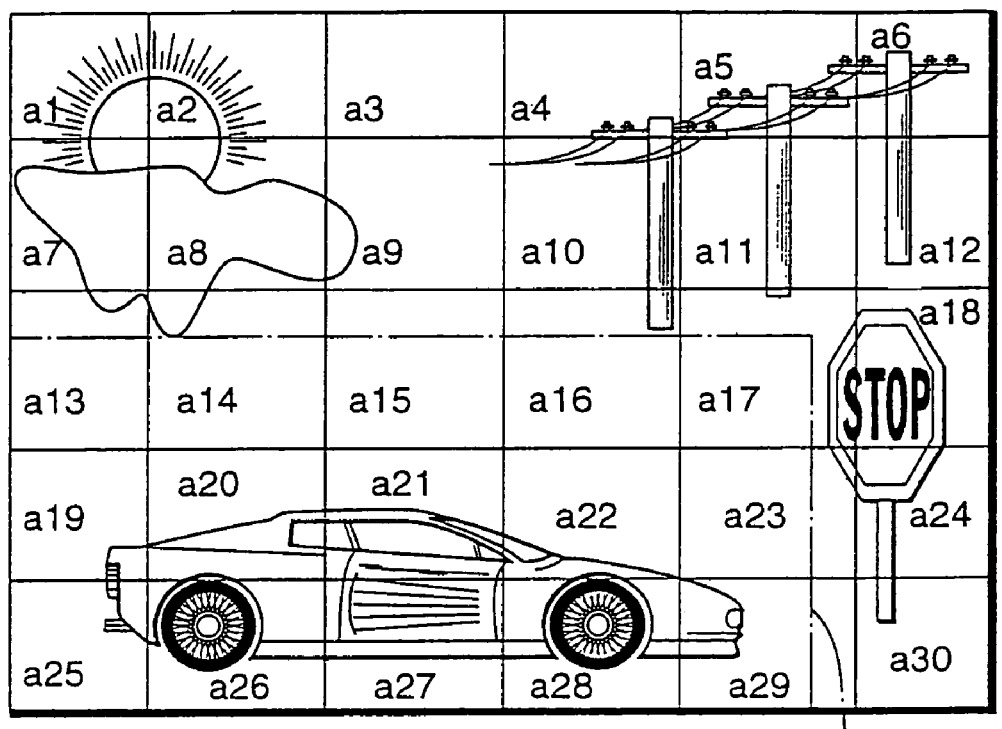
FIG. 3 illustrates an example of a reference image.
Figure 4:
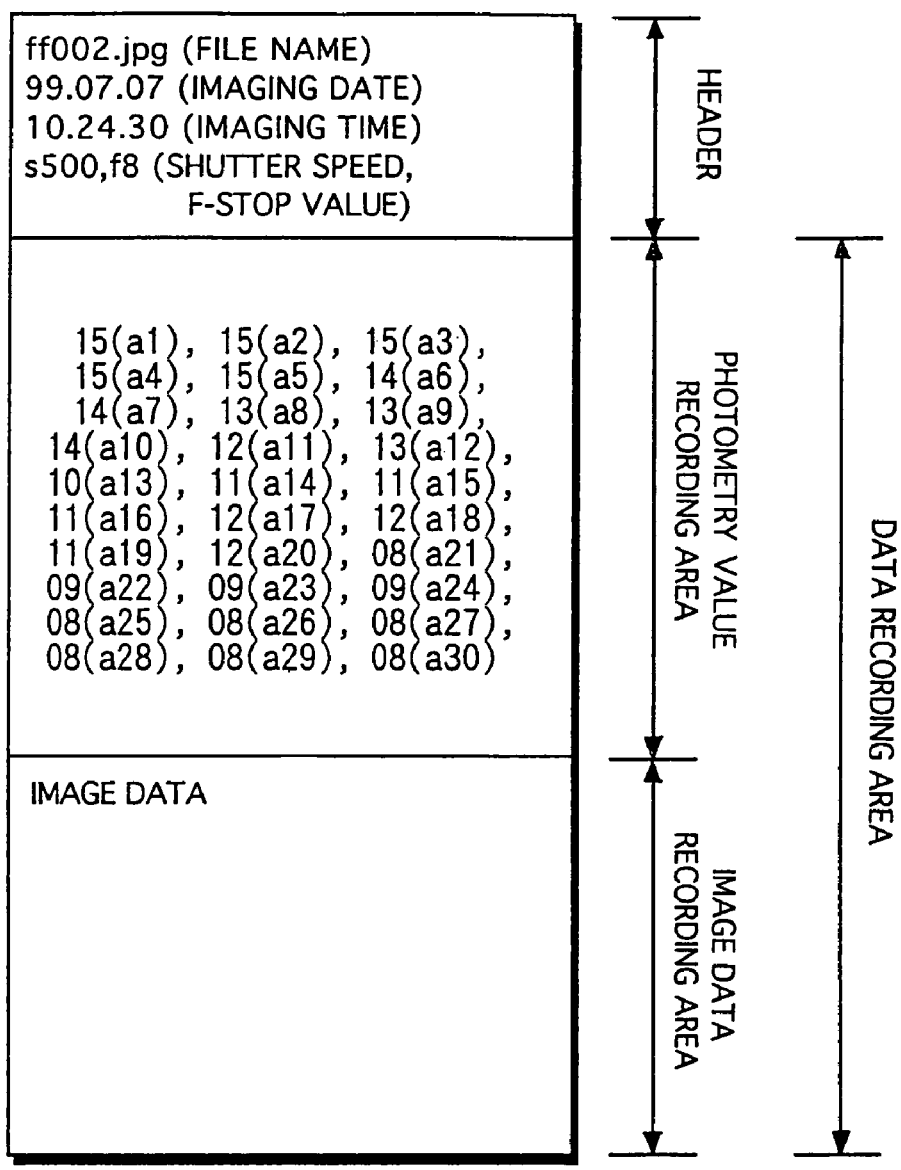
FIG. 4 illustrates the structure of an image file.

FIG. 2 is a flow chart showing the procedure for processing at the time of recording image data representing a subject image. FIG. 3 illustrates an example of a subject image (reference image). FIG. 4 illustrates the structure of an image file recorded on a memory card.

When the shutter release button 10 is pushed down (depressed) in the first stage (YES at step 20), divisional photometry is performed by the photometry device 6. The divisional photometry is performed in a total of 30 sections (areas) (divisional or divided sections a1 to a30) obtained by dividing an imaging area into six sections in the horizontal direction and five sections in the vertical direction. Data representing a divisional photometry value for each of the sections is entered into the CPU 5. The data representing the divisional photometry values is fed to a RAM 7, and is temporarily stored therein (step 21).

In the CPU 5, the divisional photometry values for one frame image are accumulated. An amount of exposure is determined such that, for example, the subject image has as a whole predetermined brightness on the basis of the accumulated value (step 22). The amount of exposure may be determined by other known method based on the divisional photometry values. The aperture 1 is controlled by the CPU 5 on the basis of the determined amount of exposure.

When the shutter release button 10 is pushed down in the second stage (YES at step 23), image data representing the subject image is fed to the RAM 7 from the CPU 5, and is temporarily stored therein (step 24).

The image data is read out of the RAM 7, and is inputted to the CPU 5. In the CPU 5, predetermined data processing such as color temperature adjustment, gamma correction and data compression is performed on the image data in the CPU 5 (step 25).

The divisional photometry value data temporarily stored in the RAM 7 is read out, and an image file as shown in FIG. 4 is created from the divisional photometry value data and the compressed image data (step 26). The created image file is recorded on a memory card 13 (step 27).

Referring to FIG. 4, a header and a data recording area are prepared in the image file.

Data representing a file name, an imaging date, imaging time, a shutter speed and an f-stop value are recorded on the header.

A photometry value recording area and an image data recording area are prepared in the data recording area.

Divisional photometry value data (EV values) are recorded on the photometry value recording area in correspondence with the sections a1 to a30 obtained by division in the subject image. Further, the compressed image data is recorded on the image data recording area.

Figure 5:
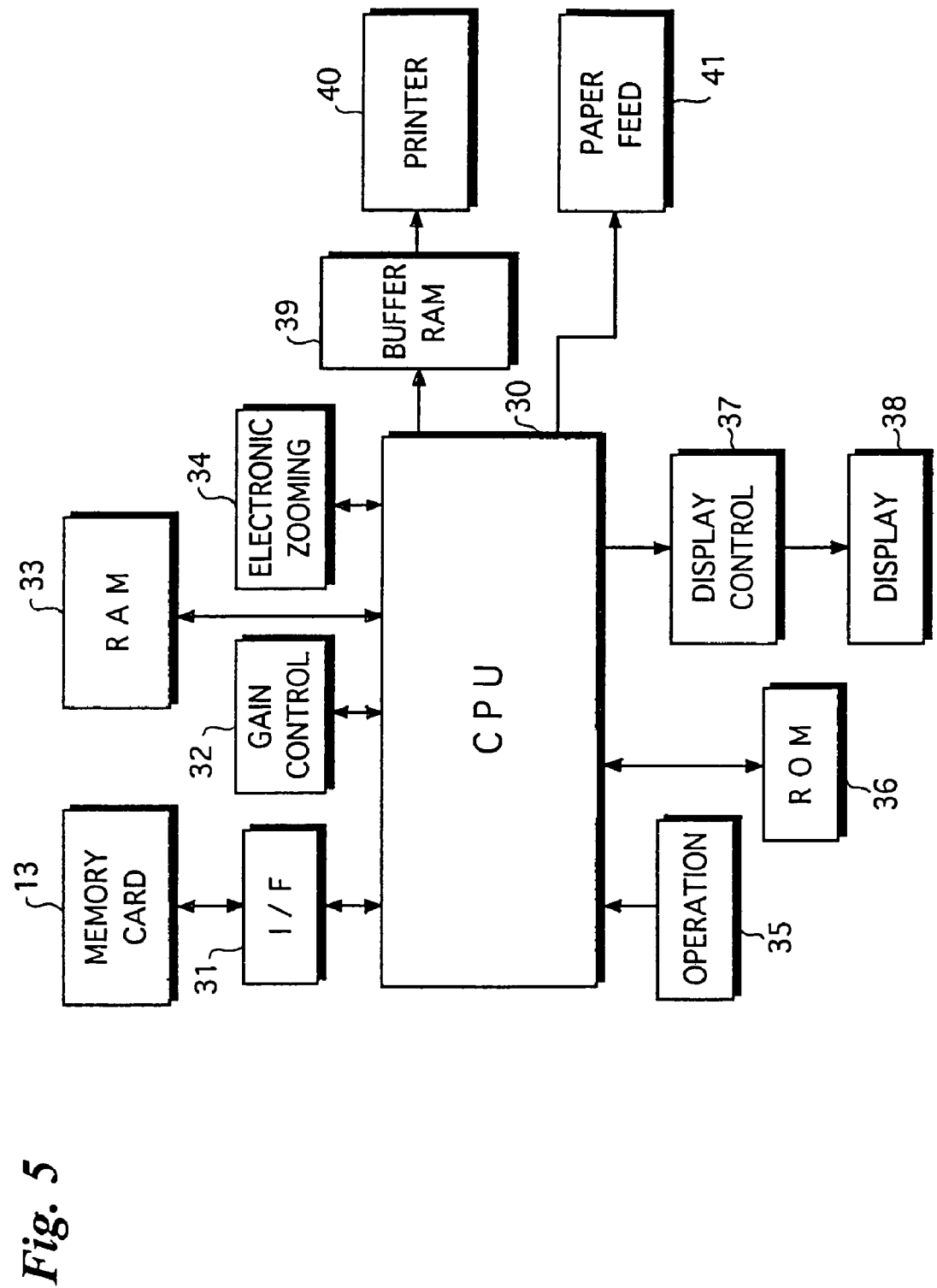
FIG. 5 is a block diagram showing the electrical configuration of a digital printer according to the first embodiment.

FIG. 5 is a block diagram showing the electrical configuration of a digital printer (printing apparatus).

The overall operation of the digital printer is supervised by a CPU 30.

A ROM 36 storing an execution program is externally attached to the CPU 30.

The digital printer has a function of performing electronic zooming. Therefore, an electronic zooming processing circuit 34 is connected to the CPU 30.

The digital printer is provided with operation switches 35. By the operation switches 35, it is possible to issue commands for image display, printing, a zoom amount, and a position. Signals issuing the commands from the operation switches 35 are inputted to the CPU 30.

Furthermore, the CPU 30 is provided with a gain control circuit 32 for level control.

Figure 6:
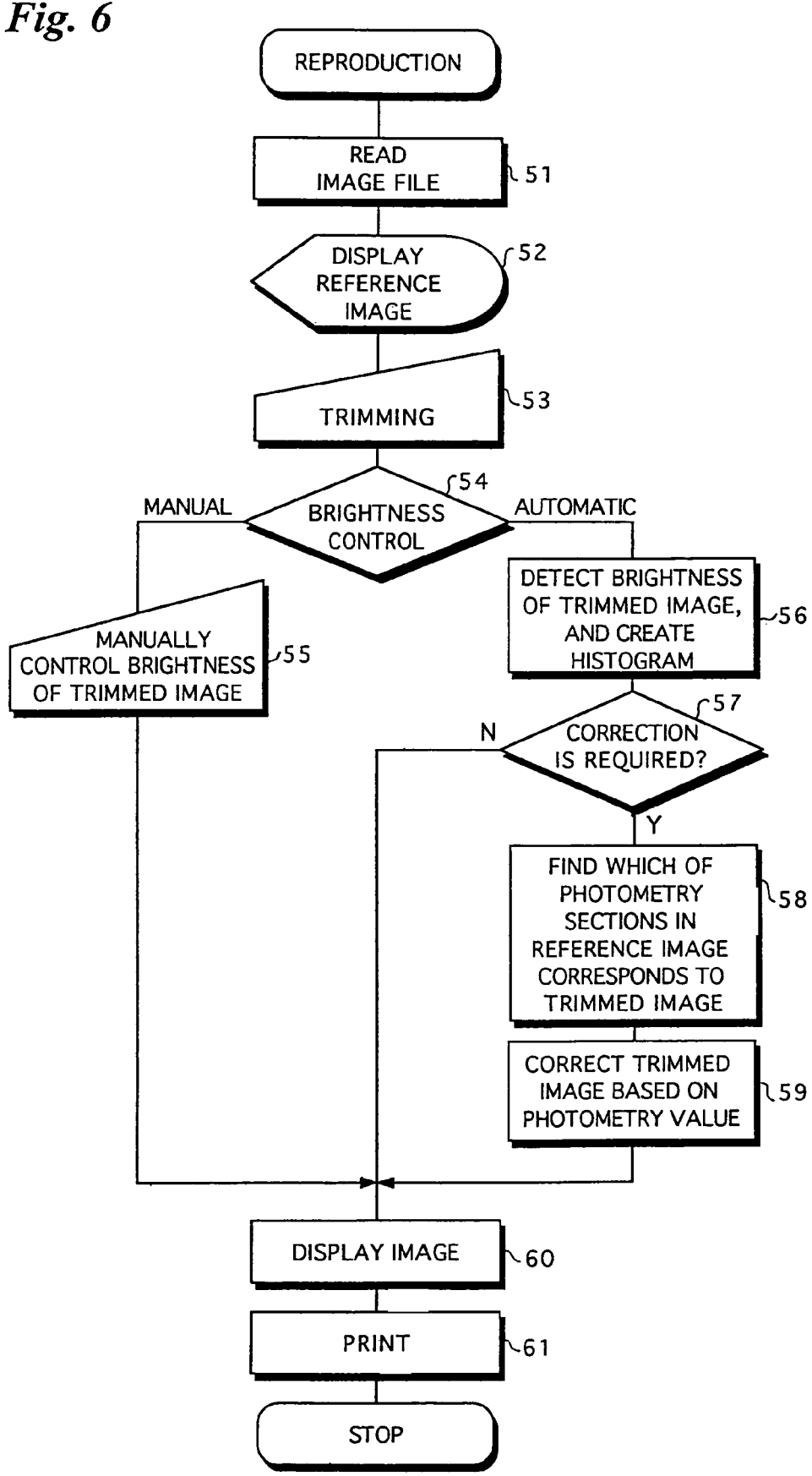
FIG. 6 is a flow chart showing the procedure for processing at the time of reproducing an image.
Figure 7:
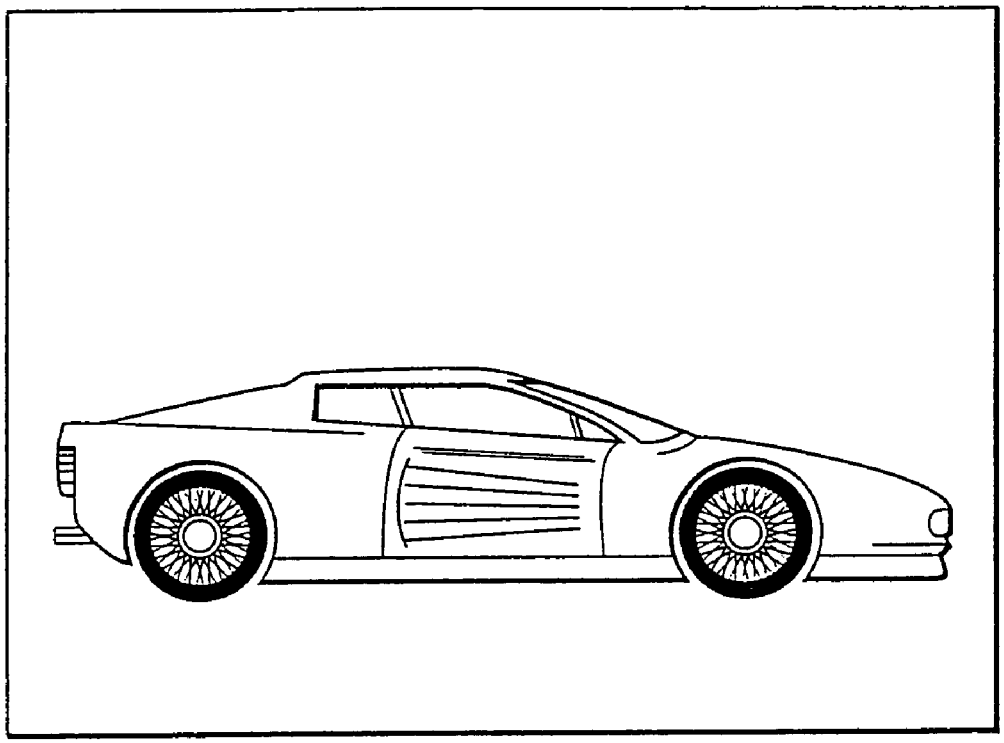
FIG. 7 illustrates an example of a trimmed image.

FIG. 6 is a flow chart showing the procedure for reproduction processing using the digital printer. FIG. 7 illustrates an example of an image obtained by cutting out a desired part of a reference image (trimming away the other portion than the desired part).

When the memory card 13 on which the above-mentioned image file (see FIG. 4) is recorded is mounted on the digital printer, the image file is read from the memory card 13 (step 51). The image file is fed to the RAM 33 through an interface 31 and the CPU 30, and is temporarily stored therein.

The image file stored in the RAM 33 is read out, and is entered into the CPU 30. In the CPU 30, the compressed image data stored in the image file is extracted. The compressed image data is expanded in the CPU 30. The expanded image data is fed to an image display control circuit 37, so that the subject image (the reference image, see FIG. 3) represented by the image data is displayed on a display screen of a monitor display device 38 (step 52).

When an image representing a part of the reference image is desired to be displayed or printed, trimming is performed using the operation switch 35 (step 53). A zone (part or area) to be cut out by trimming is designated in the reference image, as shown in FIG. 3 (in FIG. 3, the zone to be cut out is indicated by a one-dot and dash line C1) on the display screen.

When the designated zone is cut out by trimming, it is judged whether brightness control is automatically carried out or manually carried out with respect to an image in the designated zone (a trimmed image) (automatic or manual) (step 54). The judgment whether the brightness control is carried out automatically or manually will be made on the basis of the commands issued from the operation switch 35.

If the brightness control is automatically carried out, the brightness of the trimmed image (of the designated zone) is detected and a histogram on the brightness is created in the CPU 30 (step 56). When a desired part of the reference image is cut out by trimming, the trimmed image (of the desired part) may not, in some cases, have proper brightness even if the reference image has proper brightness as a whole. When the trimmed image does not thus have proper brightness, correction is required. Therefore, it is judged whether or not the trimmed image must be corrected (step 57).

If the correction is required (YES at step 57), it is found which of photometry sections obtained by division in the reference image corresponds to the trimmed image (step 58). If the trimmed image is the image in the zone, indicated by the one-dot and dash line C1, in the reference image shown in FIG. 3, it is judged that the trimmed image corresponds to photometry sections a13, a14, a15, a16, a17, a19, a20, a21, a22, a23, a25, a26, a27, a28, and a29 in the reference image.

Data representing a photometry value in the found photometry area is read out of the image file stored in the RAM 33. The CPU 30 carries out control such that the brightness of the trimmed image is proper brightness on the basis of the read photometry value data (step 59). Even if the image in the trimmed area is too bright or too dark relative to the reference image, the trimmed image has relatively proper brightness.

Image data representing the trimmed image is fed to the electronic zooming processing circuit 34, where electronic zooming processing is performed. The image data which has been subjected to the electronic zooming processing is fed to the display control circuit 37, so that the trimmed image after the electronic zooming processing is displayed, as shown in FIG. 7, on the display screen of the monitor display device 38 (step 60).

Furthermore, the image data which has been subjected to the electronic zooming processing is fed to a buffer RAM 39, and is temporarily stored therein. The image data is read out of the buffer RAM 39, and is fed to a printer 40. The trimmed image is printed by the printer 40 while conveying printing paper by a paper conveying (feeding) device 41 (step 61). The trimmed image with relatively proper brightness is printed.

When a user manually controls the brightness (step 54), a brightness correction command is issued using the operation switch 35 while displaying the trimmed image on the display screen of the monitor display device 38. Image data representing the trimmed image is fed to the gain control circuit 32, so that the level thereof is adjusted in response to the brightness correction command. The user thus manually controls the brightness (step 55). Contrast control, color adjustment, and so forth of the trimmed image are manually carried out by the user, if required. The contrast control processing, the color adjustment processing, and so forth will be realized by the CPU 30.

FIGS. 8a to 11 illustrate another embodiment of the present invention.

In the present embodiment, a subject is picked up three times (a plurality of times) in different amounts of exposure to obtain three (a plurality of) frames of subject images. Specifically, the aperture 1 of the digital still camera is controlled such that the same subject is picked up three times in different amounts of exposure.

Figure 8A:
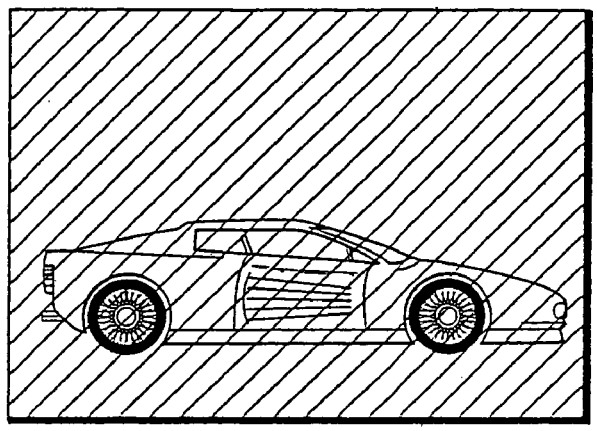

The subject image corresponding to the first frame is one obtained by picking up in an amount of exposure smaller by 1 EV than a standard amount of exposure (such an amount of exposure that the brightness thereof is proper on the basis of a photometry value) (a file name ff001b0.jpg), as shown in FIG. 8a. In FIG. 8a, the subject image is indicated by fine hatching in order to show that it is picked up in the amount of exposure smaller than the standard amount of exposure, that is, the subject image is dark. Image data representing the subject image shown in FIG. 8a is stored in an image data recording area of an image file shown in FIG. 9a.

In the image file shown in FIG. 9a, data indicating how different (−1 EV) the amount of exposure in which the subject image is picked up is from the standard amount of exposure is stored in its header in addition to data representing a file name, an imaging date, imaging time, a shutter speed and an f-stop value.

Figure 8B:
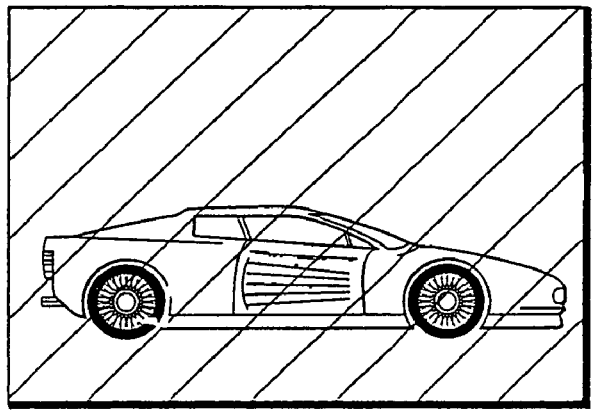

The subject image corresponding to the second frame is one obtained by picking up in the standard amount of exposure, as shown in FIG. 8b (a file name ff001b1.jpg). In FIG. 8b, the subject image is indicated by hatching with less closely spaced lines than the hatching indicating the image shown in FIG. 8a in order to show that it is picked up in the standard amount of exposure. Image data representing the subject image shown in FIG. 8b is stored in an image data recording area of an image file shown in FIG. 9b.

Also in the image file shown in FIG. 9b, data indicating how different (±0 EV) the amount of exposure in which the subject image is picked up is from the standard amount of exposure is stored in its header in addition to data representing a file name, an imaging date, imaging time, a shutter speed and an f-stop value.

Figure 8C:
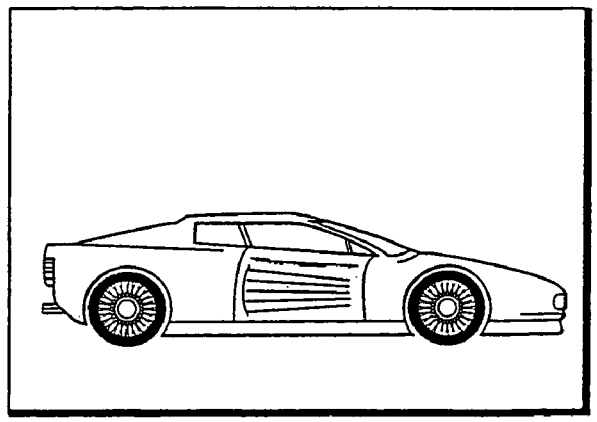

The subject image corresponding to the third frame is one which is obtained by picking up in an amount of exposure larger by 1 EV than the standard amount of exposure, as shown in FIG. 8c (a file name ff001b2.jpg). In FIG. 8c, the subject image is not indicated by hatching in order to show that it is picked up in the amount of exposure larger than the standard amount of exposure, that is, the subject image is very bright. Image data representing the subject image shown in FIG. 8c is stored in an image data recording area of an image file shown in FIG. 9c.

Also in the image file shown in FIG. 9c, data indicating how different (1 EV) the amount of exposure in which the subject image is picked up is from the standard amount of exposure is stored in its header in addition to data representing a file name, an imaging date, imaging time, a shutter speed and an f-stop value.

The three image files representing the same three subject images which differ in amounts of exposure are recorded on the memory card 13 with the image files related to each other (in correlation one another).

Figure 10:
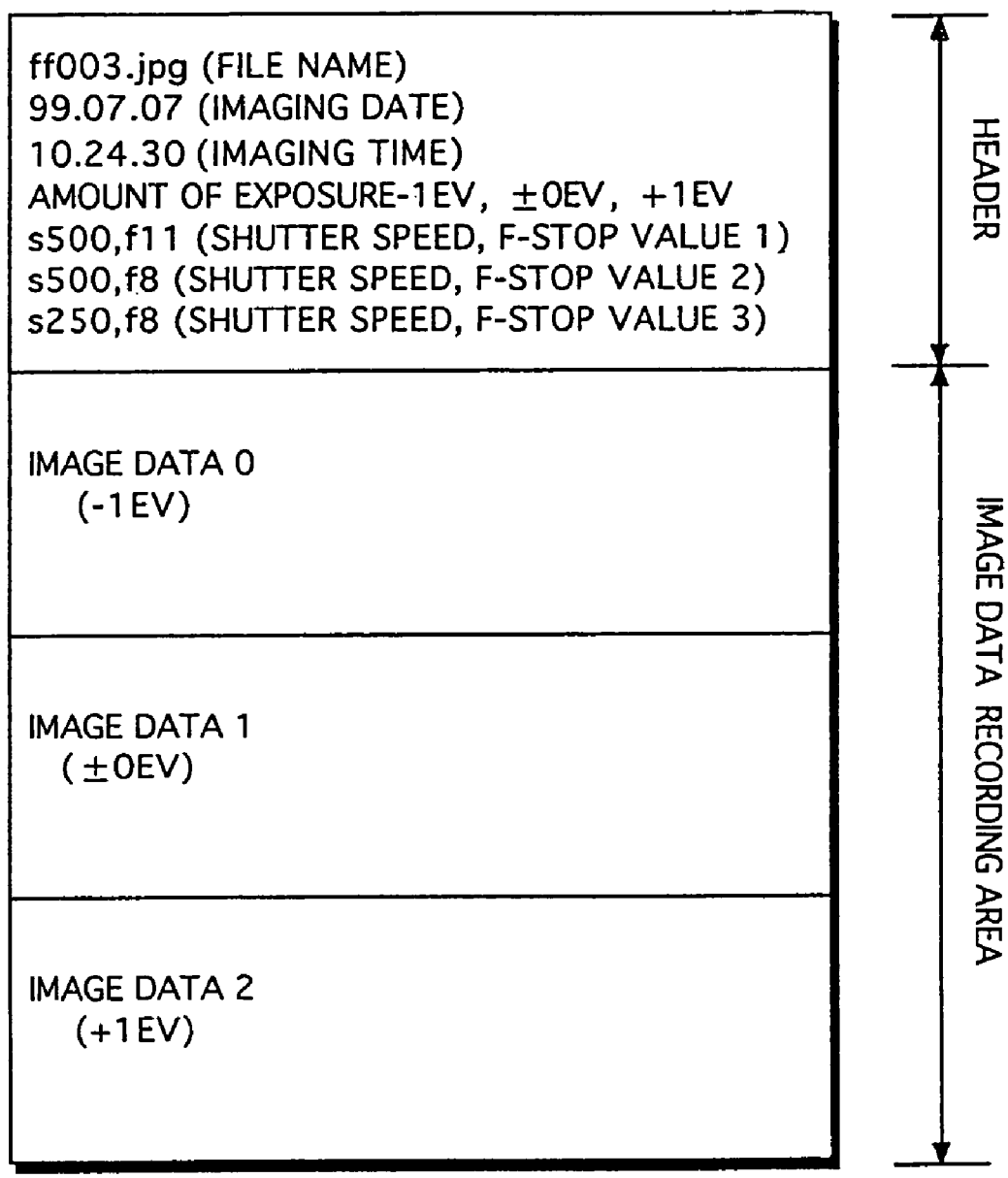

FIG. 10 illustrates another example of an image file.

Image data representing approximately the same three subject images which differ in amounts of exposure are stored in an image data recording area of one image file. Data indicating that an image represented by image data recorded on the image data recording area is picked up in an amount of exposure smaller by 1 EV than a standard amount of exposure, data indicating that it is picked up in the same amount of exposure as the standard amount of exposure, and data indicating that it is picked up in an amount of exposure larger by 1 EV than the standard amount of exposure are recorded on a header of the image file with the data related to the corresponding image data.

The three image files representing the same three subject images which differ in amounts of exposure may not be recorded on the memory card 13. The image data representing the images which differ in amounts of exposure which are thus stored in one image file may be recorded on the memory card 13.

Figure 11:
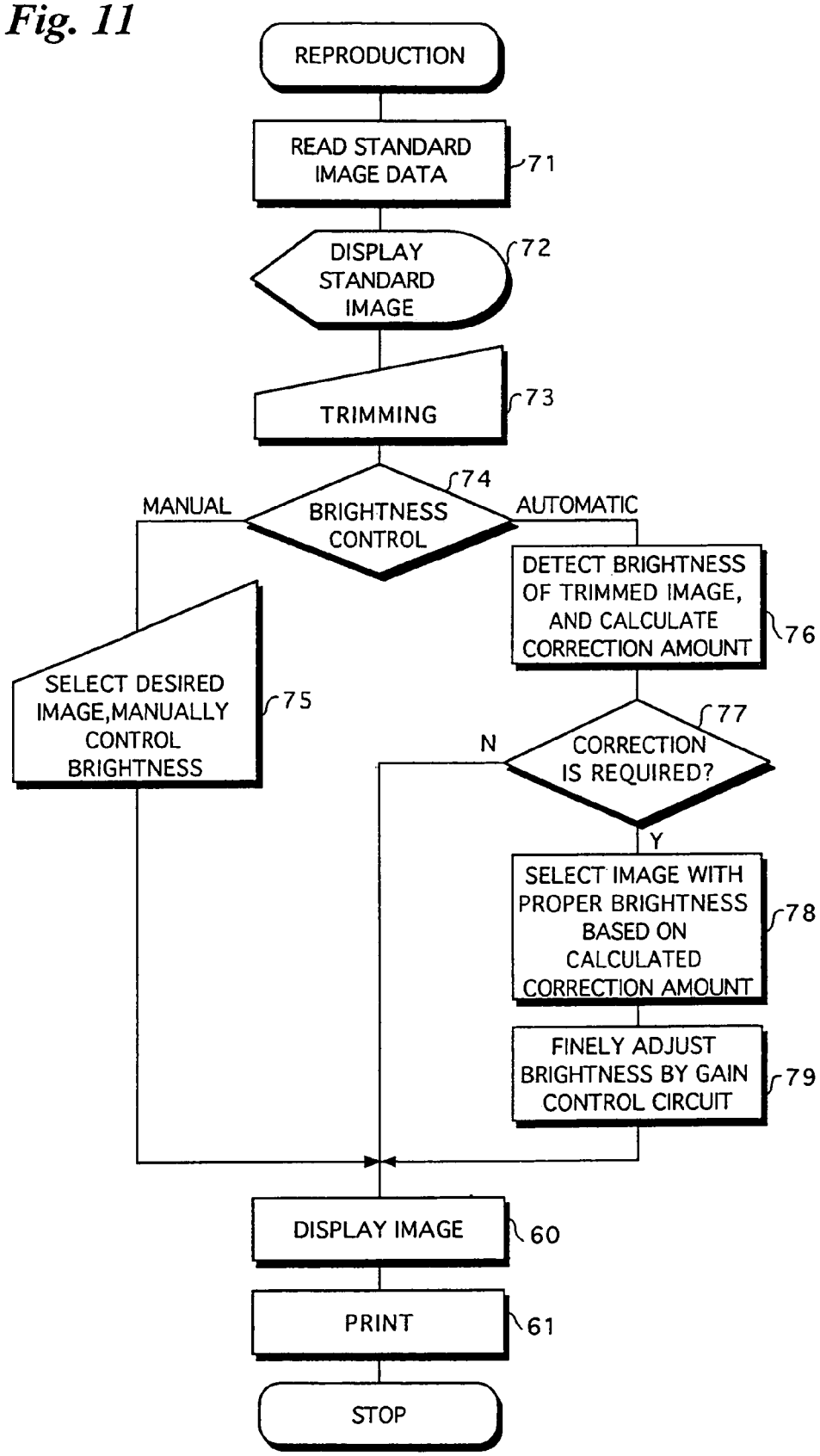

FIG. 11 is a flow chart showing the procedure for processing in a case where image files (or one image file) representing the same three subject images which differ in amounts of exposure are reproduced (played back) using the digital printer shown in FIG. 5. In FIG. 5, the same processing as the processing shown in FIG. 6 is assigned the same reference numeral.

Image data representing a standard image (an image in a standard amount of exposure) is read from the memory card 13 (step 71). The read image data representing the standard image is temporarily stored in the RAM 33 through the CPU 30. The data representing the standard image is read out of the RAM 33 and is fed to the display control circuit 37, so that the standard image is displayed on the display screen of the monitor display device 38 (step 72). The user performs trimming (cutting out of desired part) while seeing the displayed standard image (step 73). It is judged whether brightness control is carried out manually or automatically (step 74).

When the brightness control is automatically carried out, the brightness of a trimmed image is detected by the CPU 30. A correction amount required for the trimmed image to have proper brightness is calculated on the basis of the detected brightness (step 76). In this embodiment, the divisional photometry values have not been stored in the image file. An average brightness level of the image data which represents the trimmed image is calculated and the calculated average brightness is compared with the predetermined proper brightness level. The difference between the calculated average brightness level and the predetermined proper brightness level is the correction amount. In a case where the divisional photometry values are in the image file, these values may be used to find the correction amount.

If correction is required (YES at step 77), an image which may be corrected only to a slight degree is selected out of images corresponding to a plurality of frames which are recorded on the memory card 13 on the basis of the calculated correction amount (step 78). That is, such a frame of image is selected that an average brightness level of the image of the zone which correspond to the trimmed image is the closest to the proper brightness level.

Image data representing the selected image is read from the memory card 13, and is temporarily stored in the RAM 33. If the selected image is a standard image, the image data representing the standard image is not read out of the memory card 13 again because it has already been stored in the RAM 33. It goes without saying that the image data representing the standard image may be read out of the memory card 13 again.

The image data, of the zone corresponding to the trimmed image, representing the selected image is read out of the RAM 33, and is inputted to the gain control circuit 32. In the gain control circuit 32, the level of the image data is finely adjusted such that the image of the zone corresponding to the trimmed image, of the selected image, has proper brightness on the basis of the calculated correction amount or an average brightness of the read image data.

The image data whose level has been finely adjusted is fed to the display control circuit 37, so that the image with proper brightness is displayed on the display screen of the monitor display device 38 (step 60). Thereafter, printing is done (step 61).

The image which may be corrected only to a slight degree is selected out of the images corresponding to three frames which differ in amounts of exposure is selected, and the brightness of the selected image is finely adjusted. Since the correction amount is decreased, the obtained image quality is improved.

When the brightness control is manually carried out (step 74), the three image data which differ in amounts of exposure are read out of the memory card 13, and are fed to the display control circuit 37. Three images which differ in amounts of exposure are displayed on the display screen of the monitor display device 38 at different locations. The user selects the image with desired brightness out of the three images. A brightness control command is entered from the operation switch 35 with respect to the selected image.

The image data representing the image selected by the user is fed to the gain control circuit 32, so that the level of the image data is manually adjusted in response to the brightness control command issued from the user (step 75).

FIGS. 12a to 14 illustrate still another embodiment.

Figure 12A:
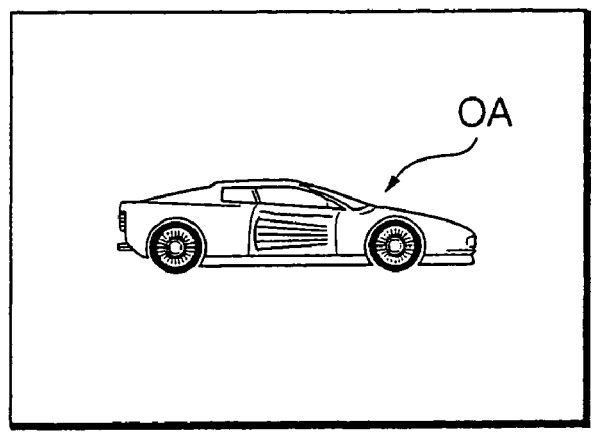
Figure 12B:
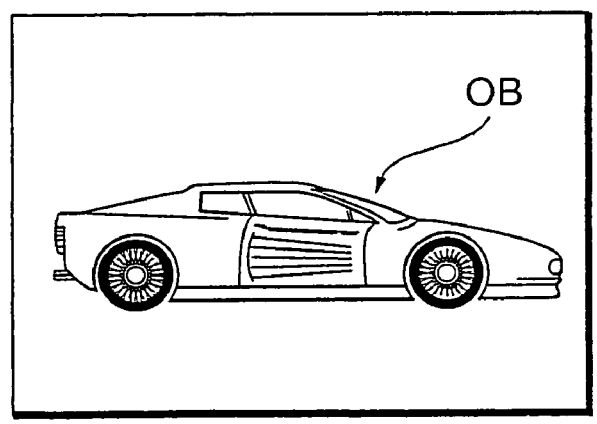
Figure 12C:
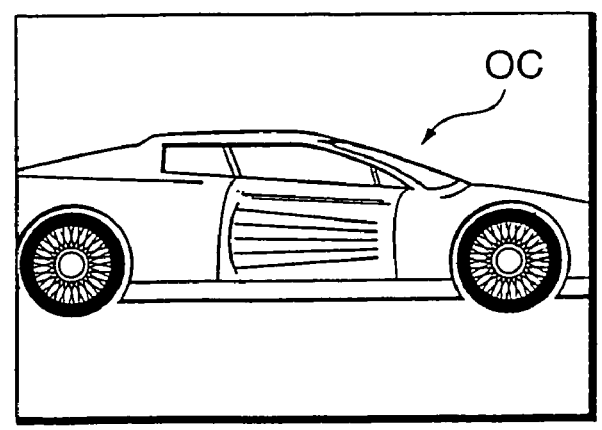
Figure 13:
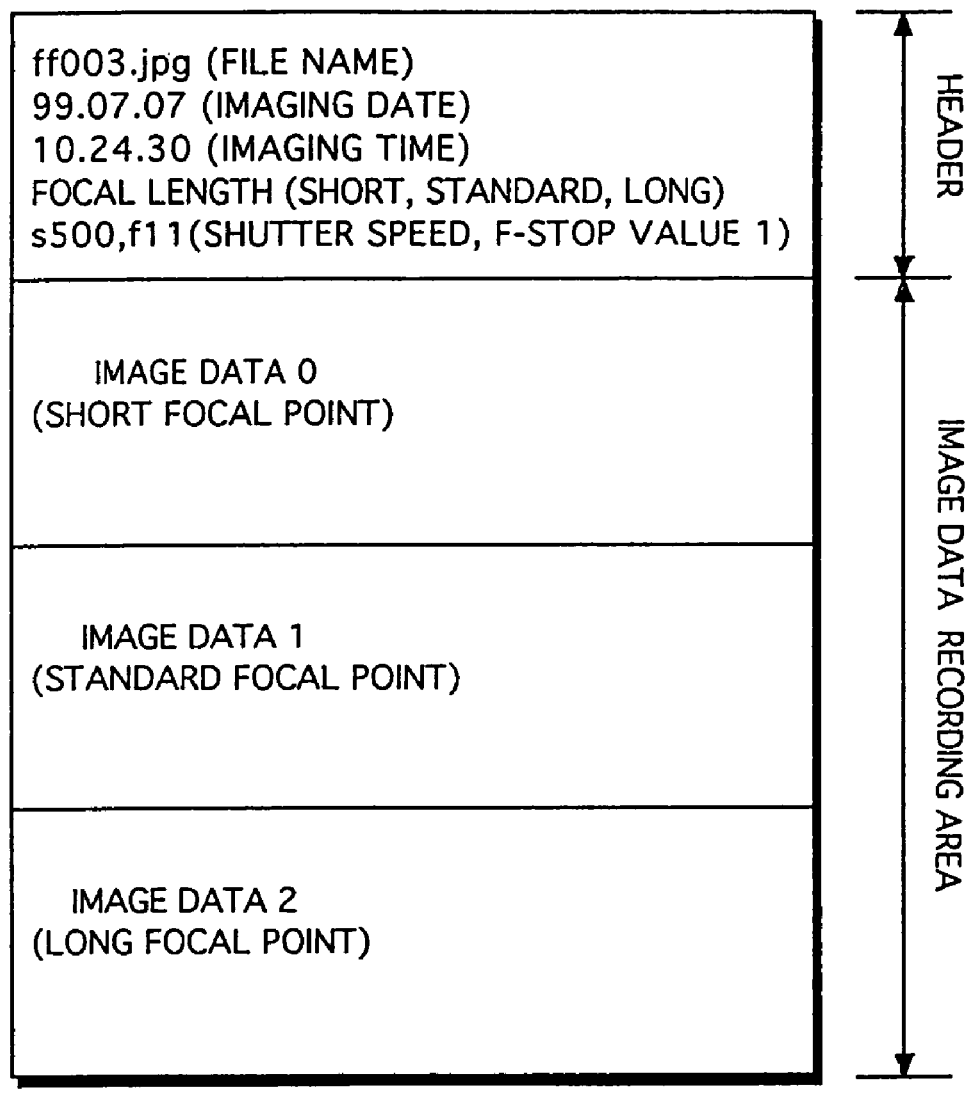

FIGS. 12a to 12c illustrate examples of subject images. FIG. 13 illustrates the structure of an image file.

In the present embodiment, a subject is picked up three times (a plurality of times) at different focal distances (lengths) (by changing the distance from the subject to the camera or by changing a zoom magnification) to obtain three (a plurality of) subject image. Consequently, the subject images including main subject images which differ in size are obtained.

The subject image corresponding to the first frame (a short focal point image or a short focal length image) is one obtained by picking up at a shorter focal point than a standard focal point, as shown in FIG. 12a. Consequently, the size of a main subject image OA is smaller than that of a standard image (an image shown in FIG. 12b). Image data representing the subject image shown in FIG. 12a is recorded on an image data recording area shown in FIG. 13.

A header recording area and the image data recording area are formed in the image file.

Focal distance (length) information indicating how focal length is used to obtain image data recorded on the image data recording area is recorded on the header in addition to a file name, an imaging date (although one imaging date is recorded in an example shown in FIG. 13, three imaging dates may be recorded in correspondence with the three frames), imaging time, a shutter speed and an f-stop value.

The subject image corresponding to the second frame (the standard image) is one obtained by picking up at a standard focal point, as shown in FIG. 12b. A main subject image OB of standard size is obtained. Image data representing the subject image shown in FIG. 12b is also recorded on the image data recording area shown in FIG. 13.

The subject image corresponding to the third frame (a long focal point image) is one obtained by picking up at a longer focal point than the standard focal point, as shown in FIG. 12c. Consequently, a main subject image OC larger than the standard main subject image OB is obtained. Image data representing the subject image shown in FIG. 12c is also recorded on the image data recording area shown in FIG. 13.

The image data representing the three images are recorded on the memory card 13 with respect to approximately the same main subject images OA, OB and OC which differ in focal distances (differ in subject image size).

Figure 14:
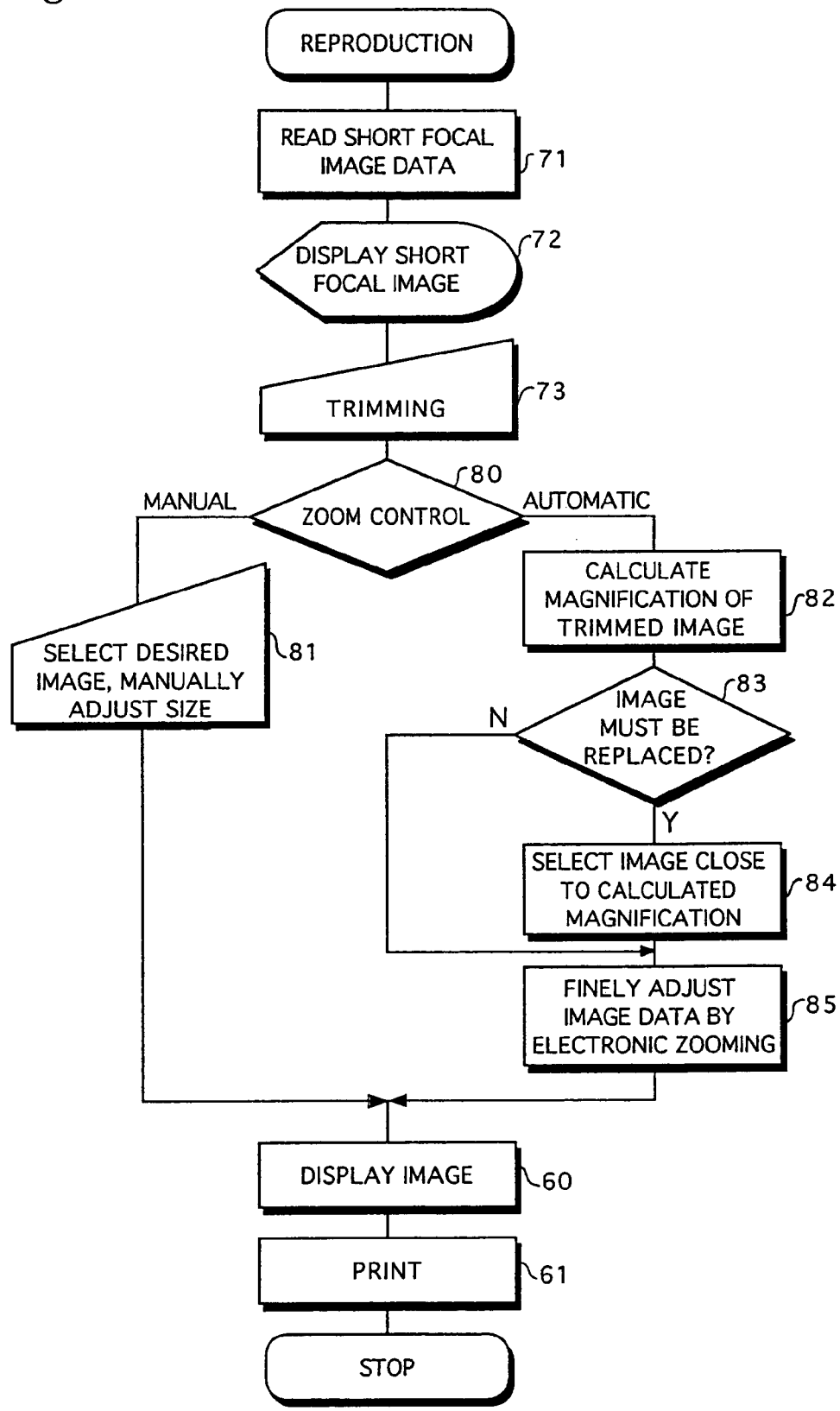

FIG. 14 is a flow chart showing the procedure for processing in a case where the memory card 13 on which image data representing three images which differ in size are recorded with respect to approximately the same main subjects is reproduced (played back) using the digital printer shown in FIG. 5. In FIG. 14, the same processing as the processing shown in FIG. 11 is assigned the same reference numeral.

Short focal image data (image data representing an image including a main subject image which is smaller than that of standard size) is read out of the memory card 13, and is fed to the display control circuit 37 (step 71). A short focal image is displayed on the display screen of the monitor display device 38 (step 72). Trimming is performed by the user (step 73), and it is judged whether or not zooming control is carried out automatically or manually with respect to a trimmed image (step 80).

When the zooming control is automatically carried out, in order to enlarge the trimmed image, the magnification of the trimmed image is calculated on the basis of the size of the trimmed image and the size of the frame of image (step 82) so that the size of the trimmed image becomes equal to the size of the frame of image. It is judged whether or not electronic zooming processing may be performed using an image other than the short focal image. That is, it is judged whether or not the electronic zooming processing may be performed by replacing the image (step 83).

The first ratio of the size of (the main subject image of) the short focal image to that of (the main subject image of) the standard image, and the second ratio of the size of the short focal image to that of the long focal image are predetermined. If the above calculated magnification is closer to 1, the short focal image is used. If the calculated magnification is closer to the first ratio or the second ratio, the standard image or the long focal point image is selected (step 84). Image data representing the image of the zone corresponding to the trimmed image, of selected image, is read out of the memory card 13, and is temporarily stored in the RAM 33. The image data is fed to the electronic zooming processing circuit 34 from the RAM 33. In the electronic zooming processing circuit 37, the size of the read image is finely adjusted by the electronic zooming processing such that the size of the image becomes equal to that of a frame of image (step 85). When the short focal images is used, the electronic zooming processing is executed as required.

The image data which has been finely adjusted is fed to the display control device 37, so that the image after the electronic zooming is displayed on the display screen of the monitor display device 38, as shown in FIG. 7 (step 60). Thereafter, the zoomed image is printed (step 61).

When the zooming control is manually carried out (step 80), image data representing images corresponding to three frames which differ in size, which are recorded on the memory card 13, are read out. The read image data are fed to the display control circuit 37. Images corresponding to the three frames which differ in size are displayed on the display screen of the monitor display device 38, preferably at once at different locations in the screen. The user selects the image including a main subject image of desired size out of the images corresponding to the three frames which differ in size (step 81). Thereafter, a size control command is issued by the operation switch 35, as required. In the electronic zooming processing circuit 34, the electronic zooming processing is performed in response to the size control command.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image output apparatus comprising:
a reading device for reading, from a recording medium on which image data representing subject images of a plurality of frames which have been obtained by imaging a subject under different imaging conditions, including exposure amount, the image data representing a specified frame of image;
a display control device for controlling a display device such that the subject image represented by the image data read by said reading device is displayed on a display screen;
a designation device for designating a desired image zone in the subject image displayed on said display screen;
retrieval means for retrieving a frame of image data representing the most proper subject image out of the subject images of the plurality of frames with regard to the image in the zone designated by said designation device, wherein said retrieval means selects a frame of image data having the most proper brightness with regard to the image in the zone designated by said designation device; and
an image data output device for outputting the image data found by said retrieval means.

2. The image output apparatus according to claim 1, further comprising an adjusting means for adjusting brightness of the image, in a zone corresponding to the designated zone, of the selected frame of image data.

3. A method of outputting an image, comprising the steps of:
reading, from a recording medium on which image data representing subject images of a plurality of frames which have been obtained by imaging a subject under different imaging conditions, including focal length, the image data representing a specified frame of image;
displaying on a display screen the subject image represented by the read image data;
designating a desired image zone in the subject image displayed on said display screen;
retrieving a frame of image data representing the most proper subject image out of the subject images of the plurality of frames with regard to the image in the designated zone, by selecting a frame of image data having the most proper size with regard to the image in the zone designated by designating step; and
outputting the image data found by the retrieval.

4. The image output apparatus according to claim 3, further comprising an enlarging means for enlarging the size of the image, in a zone corresponding to the designated zone, of the selected frame of image data.

* * * * *